United States Patent [19]
Gu

[11] Patent Number: 5,978,735
[45] Date of Patent: Nov. 2, 1999

[54] SATELLITE NAVIGATION METHOD

[75] Inventor: Xiaogang Gu, Erbach, Germany

[73] Assignees: NFS Navigations-und Flugführungs-Systeme GmbH, Ulm; Daimler-Benz Aktiengesellschaft, Stuttgart, both of Germany

[21] Appl. No.: 08/965,027

[22] Filed: Nov. 5, 1997

[30] Foreign Application Priority Data

Nov. 5, 1996 [DE] Germany .......................... 196 45 528

[51] Int. Cl.[6] ................................................. G06G 7/78
[52] U.S. Cl. ...................... 701/213; 701/214; 701/215; 701/300; 701/225
[58] Field of Search .................................... 701/213, 207, 701/300, 301, 214, 215, 225, 202; 340/988, 995; 342/357, 450, 457, 463, 352; 73/178 R

[56] References Cited

U.S. PATENT DOCUMENTS

| | | | |
|---|---|---|---|
| 5,072,227 | 12/1991 | Hatch ..................................... | 342/357 |
| 5,189,430 | 2/1993 | Yano et al. ............................. | 701/213 |
| 5,357,437 | 10/1994 | Polvani .................................. | 701/224 |
| 5,359,332 | 10/1994 | Allison et al. ......................... | 342/357 |
| 5,379,045 | 1/1995 | Gilbert et al. ......................... | 342/357 |
| 5,477,458 | 12/1995 | Loomis .................................. | 342/357 |
| 5,576,973 | 11/1996 | Haddy .................................... | 342/357 |
| 5,831,575 | 11/1998 | Gu ......................................... | 342/357 |

Primary Examiner—Jacques H. Louis-Jacques
Attorney, Agent, or Firm—Venable George A. Spencer; Norman N. Kunitz

[57] ABSTRACT

A satellite navigation method for a mobile station which is installed, in particular, in a traffic route-guided vehicle. Several reference marks are installed along the traffic route at predetermined distances from one another, with the geographic positions of the reference marks being known or supplied to a mobile station passing a reference mark. The reference marks are detected by a reading device which is disposed in the mobile station. At the location of a reference mark and at the moment of its detection, the actual ranges and the pseudoranges from all satellites that are relevant for navigation are determined simultaneously and are compared. The measuring error change of the satellite navigation or the adjustment of the correction value maybe carried out with the aid of a velocity indicator and a route map mounted on the mobile station. From these, correction values are derived which are used for a pseudorange correction outside of the range of the reference marks. The method permits a (navigational) precision corresponding to a differential navigation method without necessitating communication with a stationary reference station.

12 Claims, 2 Drawing Sheets

SATELLITE NAVIGATION METHOD

REFERENCE TO RELATED APPLICATIONS

This application claims the priority of German application Ser. No. 196 45 528.6, filed Nov. 5, 1996, which is incorporated herein by reference.

BACKGROUND OF THE INVENTION

The present invention relates to a satellite navigation method for a mobile station, wherein the geographic position of the mobile station is determined in the mobile station by means of a receiving and evaluating unit for the reception and evaluation of satellite navigation signals.

The invention relates in particular to a satellite navigation method for a terrestrial (earth-based) mobile station, that is, a station that is mobile on the earth's surface (dry land and/or water) wherein the station comprises at least one receiving and evaluating arrangement for the reception and evaluation of the available satellite signals of the navigation satellites, for example, according to the American GPS system and/or the Russian GLONASS system. With the GPS system, a precision of ±100 m (95%) can be accomplished for civilian applications in the determination of the geographic position of a mobile station if the satellite signals are evaluated directly. If it is necessary to determine the position more precisely, a differential navigation method is generally used, for example, the so-called DGPS ("Differential Global Positioning System").

During this process, stationary reference stations, so-called DGNSS reference stations are employed, each having a known geographic position. In such a reference station, the geometric or active ranges from the (satellite) receiving antenna to all receivable ("visible") navigation satellites are known at all times. When the satellite signals mentioned at the outset are received at the antenna, so-called pseudoranges from the receivable satellites emerge from the signal delay times. From the comparison of the pseudoranges with the known geometric ranges, standardized correction values are determined. These are emitted continuously or periodically over time by the reference station via known data links (radio channels). A mobile station can then receive the correction values, and the pseudoranges determined by the mobile station can be corrected with these correction values. With a differential satellite navigation method of this type, it is possible to accomplish a precision in the range of several hundred meters or even less for the mobile station when determining its position.

However, it is a drawback that such a standardized differential navigation method is technically complex for a terrestrial land application (navigation on the land surface). This is due to the fact that for a reliable transmission of the differential corrections (correction values), particularly in hilly and/or mountainous terrain, a plurality of (relay) transmitting stations are necessary to supply a mobile station with correction values at any time without shadowing of the data link (radio channel) from the DGNSS reference station to the mobile station taking place.

It is the object of the invention to provide a method of the generic type described above which permits an economical and reliable position determination for a mobile station by means of satellite navigation with a precision which corresponds to that of a differential satellite navigation method and without necessitating a so-called DGNSS reference station.

SUMMARY OF THE INVENTION

The above object generally is achieved according to the present invention by a satellite navigation method for a mobile station, wherein the geographic position of the mobile station is determined using a satellite receiving and evaluating unit, which is disposed in the mobile station, for the reception and evaluation of satellite navigation signals, and wherein:

a plurality of reference marks whose respective geographic positions are known are installed along a possible route of the mobile station;

a reading device is installed in the mobile station for detecting the reference marks;

during the detection of a reference mark, the known position of the respective reference mark is supplied to the evaluating unit and, from this known position, a known reference position for a satellite receiving antenna on the mobile station is determined;

during the detection of the reference mark, i.e., at the time of reception, the associated actual geometric ranges from predetermined, receivable navigation satellites are determined simultaneously for the reference position;

during the detection of the reference mark, the pseudoranges of the reference position from the predetermined, receivable navigation satellites are determined simultaneously by using signals received from the navigation satellites by the satellite receiver of the mobile station;

the pseudoranges are compared with the associated actual ranges from the predetermined, receivable navigation satellites to the reference position of the mobile station at the reference mark, and range correction values are determined from the comparison;

between two reference marks, further pseudoranges are determined for the mobile station by satellite navigation receiver, and these further pseudoranges are corrected by the correction values; and, the momentary position of the mobile station is determined from the corrected pseudoranges, as needed.

It is an advantage of the invention that a precise satellite navigation is possible almost anywhere. A radio link which, in a disadvantageous manner, is prone to interference and can be shadowed, is not needed.

The invention is based on a mobile station having a (satellite) receiving and evaluating arrangement with which only a direct satellite navigation mentioned at the outset is possible, that is, the satellite signals are received and evaluated directly. This means that basically only an imprecise position determination is permitted. Such mobile stations and/or the components necessary for such stations can be produced at present in a cost-effective manner and are therefore used for many applications, for example, in motor vehicles, locomotives, ships as well as in small stations that can be carried by one person. If such a mobile station is now disposed at a reference mark whose geographic position is known precisely, the geometric (actual) ranges from all receivable navigation satellites can be determined for this reference mark (by means of the ephemeris data) that is, without satellite navigation. On the other hand, the so-called pseudoranges can be measured by the mobile station through satellite navigation receiver at the location of the reference mark or in its proximity at a predetermined moment, for example, when crossing (passing) the reference mark. From the comparison of the measured pseudoranges with the known ranges, the correction values customary for the differential satellite navigation can be determined in a manner known per se. If the mobile station moves away from the reference mark, these correction values are used to correct further position determinations according to differential satellite navigation. If, along its path, the mobile station reaches a further reference mark or a position that can be measured precisely with respect to the reference mark, the correction values are determined anew in the manner described.

This means that the described method advantageously permits a type of differential satellite navigation without employing an otherwise necessary DGNSS reference station and a radio channel for transmitting the differential correction values.

The differential corrections can further be improved for a moving mobile station between the reference marks by adding range rate corrections. A range rate correction can be yielded by comparing measured pseudorange rate with the sum of the predetermined Doppler contribution of a receivable satellite and the Doppler contribution of the mobile station. The Doppler contribution of the mobile station can be derived by means of the measured mobile station velocity and the geometry between satellite and mobile station. The velocity can be determined, for example, in a manner that is continuous over time by means of a tachometer for the (velocity) amount and a comparison with a route map (for the direction of travel).

For the cited reference marks, already existing (reference) marks can be used advantageously which are adapted to the type of the mobile station and/or its use. If such a mobile station is disposed, for example, in a locomotive, it is useful to use all signal devices which the locomotive recognizes automatically as reference marks. Such signal devices are, for example, inductively operating position transmitters and/or automatic train running control systems which are presently arranged along and/or between the tracks. For a motor vehicle, for example, the presently existing induction loops which loops are used to control traffic and are disposed within the road surface, can be employed as reference marks. Furthermore, it is possible, for example, to use so-called geodetic surveying points which are recognized by the mobile station, for example, by means of an optically operating reading device. In a waterway, for example, a river or a canal, for example, navigational aids (buoys) which are already employed therein can be used as reference marks.

This means that it is necessary only once to determine the geographic positions associated with all of the reference marks used, for example, along a traffic route, and to then store them in such a manner that they can be used by a mobile station as needed. Such storage can take place, for example, in a data store available in the evaluating unit and/or in a data store disposed in a transmitting device at the reference mark, which data store can be accessed by the mobile station, for example, by means of a radio link corresponding to the data interrogation in a transponder.

The invention is described below in greater detail by way of embodiments which can be applied to vehicles which move on traffic routes, e.g., rail or road.

BRIEF DESCRIPTION OF THE DRAWINGS

The invention is illustrated in the appended drawings wherein.

DETAILED DESCRIPTION OF THE PREFERRED EMBODIMENT

Figure 1:
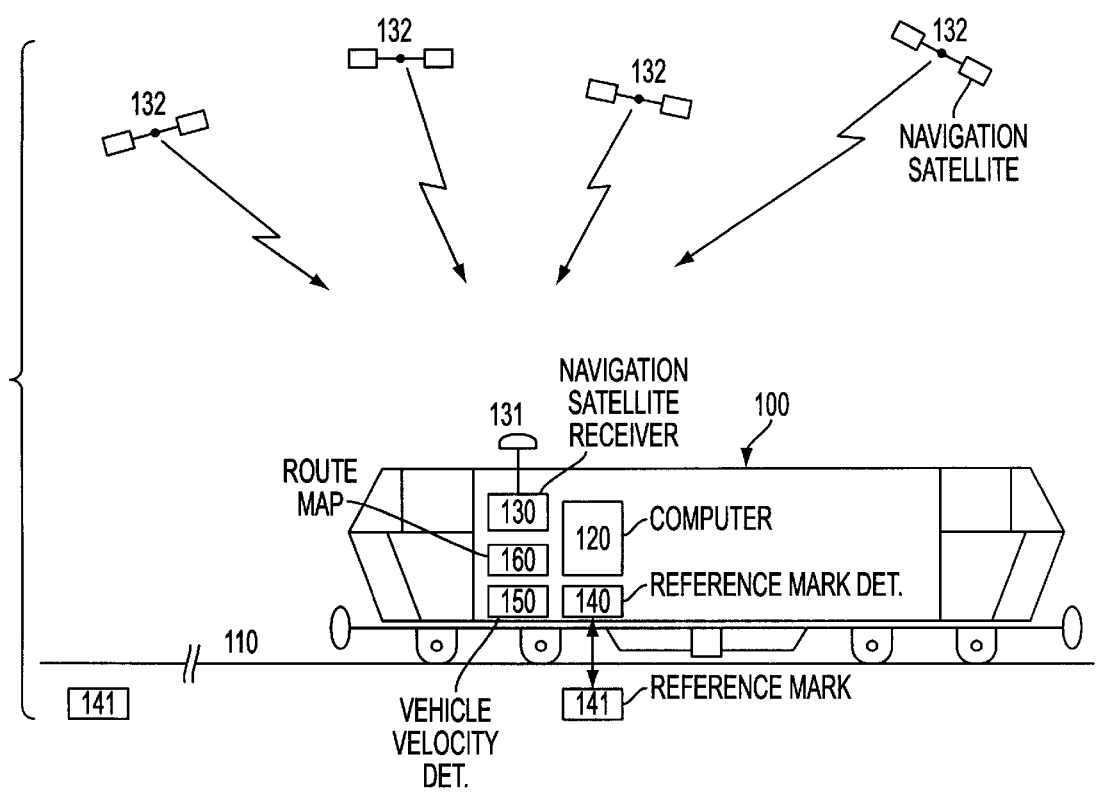
FIG. 1 is a schematic representation of the vehicle positioning system with the important physical components in a railway environment as an example.
Figure 2:
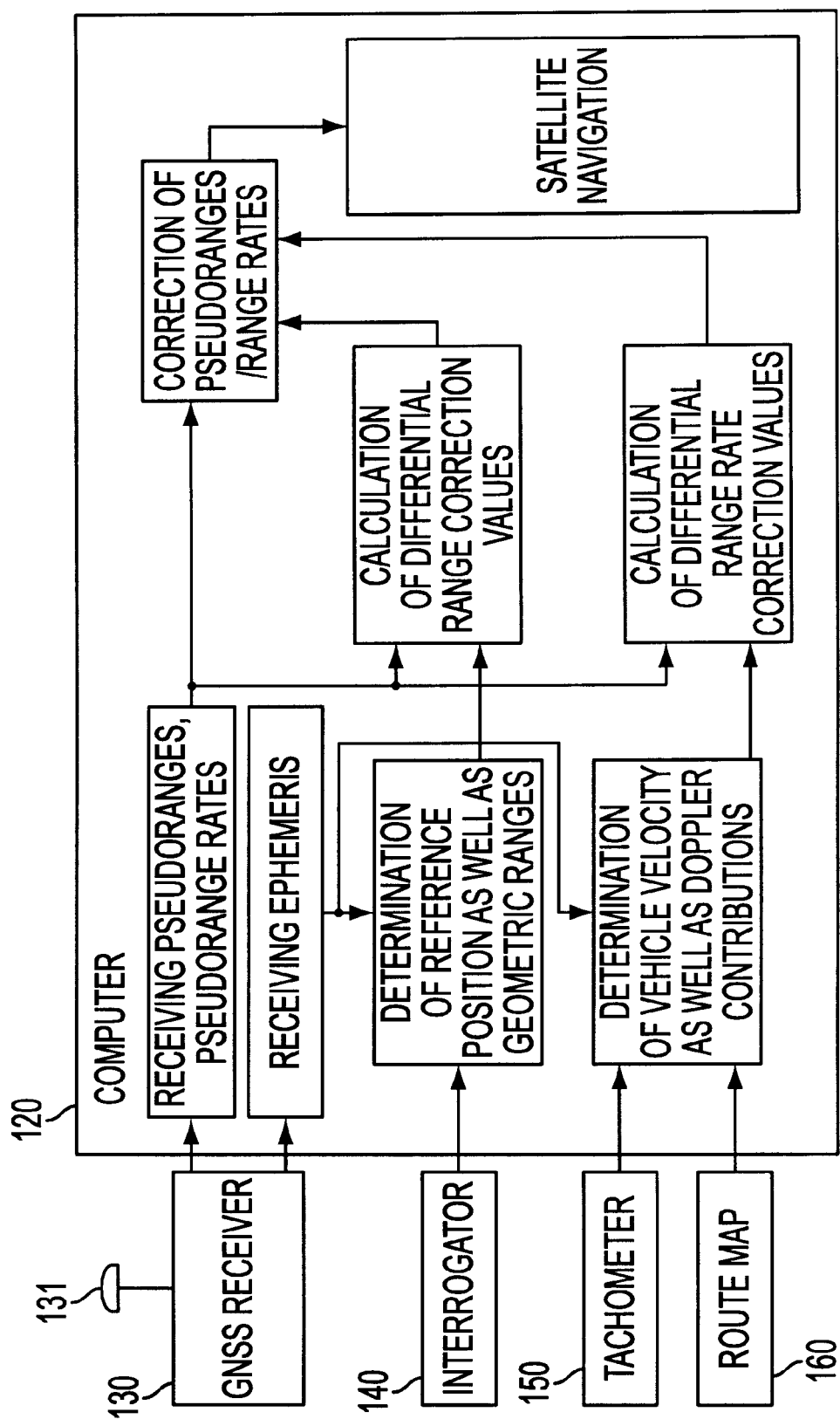
FIG. 2 is a flow diagram for the functions which are utilized in the computer on board the vehicle.

Referring to the drawings, the cited reference marks 141 are or will be installed in and/or on the traffic routes 110 in known (geodetic) positions. Preferably, each vehicle 100 also comprises at least one automatic reading device (sensor) 140 for the recognition (detection) of the reference marks. Each vehicle also contains a satellite navigation arrangement including satellite receiver 130 and antenna 131 to receive (navigation) satellite 132 signals and to evaluate them. Furthermore, it is advantageous for a further enhancement of the (navigational) precision for the vehicle to be provided with a velocity indicator (tachometer) 150 and a route map 160. All information from reference marks, navigation satellites and vehicle velocity are evaluated in a computer 120.

If, at a reference moment $t_0$, the vehicle 100 then passes a reference mark 141 having a known geodetic (geographic) position, the geodetic (geographic) position of a predetermined vehicle location or of the satellite receiving antenna 131 (GPS antenna) is known at this reference moment $t_0$ (from the arrangement of the antenna on the vehicle and from the arrangement of the reference mark with respect to the travel route). The actual ranges of this reference position from at least three receivable satellites 132 are also determined from the known geographic data for the reference mark as well as its relationship to the reference position, and satellites ephemeris data for satellite position determination. The moment of the passing of the reference mark (reference moment $t_0$) is determined by means of the above-mentioned reading device 140. In this process, that moment is used, for example, at which the reference mark is recognized. For this known position of the GPS antenna (at the reference moment $t_0$), the so-called pseudoranges or distances from at least three receivable and/or predetermined GPS satellites 132 are determined from satellite navigation measurements that are known per se. For these pseudoranges $PR_i(t_0)$ known at the reference moment $t_0$, range or distance correction values $\Delta R_i(t_0)$ are then determined according to the formula or equation $$\Delta R_i(t_0) = R_i(t_0) - PR_i(t_0) + c\Delta t(t_0) \quad (1)$$

with to $t_0$=reference moment, $\Delta R_i(t_0)$=range correction of the satellite measurement i at the reference moment $t_0$, $R_i(t_0)$=geometric range between the satellite i and the GPS antenna at the reference moment $t_0$, $PR_i(t_0)$=measured range (pseudorange) between the satellite i and the GPS antenna at the reference moment $t_0$, and $c\Delta t(t_0)$=clock error of the GPS receiver in the mobile station at the reference moment $t_0$.

The range corrections $\Delta R_i(t_0)$ determined at the reference moment to according to equation (1) are then used for a predetermined time interval $t-t_0$ following the reference moment $t_0$ according to the formula or equation $$PR_{Corr\_i}(t) = PR_i(t) + \Delta R_i(t_0) \quad (2)$$

with $PR_{Corr\_i}(t)$=corrected range (pseudorange) between the satellite i and the GPS antenna of the mobile station at the moment t, $PR_i(t)$=measured range (pseudorange) between the satellite i and the GPS antenna at the moment t.

With the corrected ranges $PR_{Corr\_i}(t)$ according to equation (2), a precision can be accomplished for the position determination for a certain time duration $t-t_0$ which precision corresponds to that of the conventional differential satellite navigation (with stationary DGNSS reference station). It is shown that this precision is diminished when the time difference $t-t_0$ increases. Since the measuring errors or the desired correction values change for example, if the selective availability (SA) is active for the navigation with GPS, a large time difference $t-t_0$ means a reduction of the error correlation, so that the correction values determined for the error correlation can become increasingly inaccurate as the time distance from the reference mark increases.

This drawback is eliminated in a modification of the invention in that the velocity of the vehicle with respect to the earth's surface is considered. The velocity value can be determined by means of a velocity indicator (tachometer) 150. The direction of the velocity can be determined by using a route map 160 with an estimated mobile station position. During the measurement of the satellite signals, the thus determined (vehicle) velocity can be projected to the lines of sight between the GNSS receiver and the predetermined, receivable navigation satellites in a so-called Doppler contribution.

The desired Doppler contributions ensue from the vehicle velocity determined by the velocity indicator and the route map, from the satellite velocities calculated by way of ephemeris data and from the satellite receiver geometry (for the mobile station). A correction value of the range rate is calculated according to the equation or formula $$\Delta \dot{R}_i(\tau) = DP_i(\tau) + DP_F(\tau) - \dot{R}_i(\tau) + c\Delta t(\tau) \tag{3}$$

where $\Delta \dot{R}_i(\tau)$=correction of the range rate of the satellite measurement i at the moment $\tau$, $DP_i(\tau)$=Doppler contribution of the i-th satellite as a function of the known satellite movement at the moment $\tau$, $DP_F(\tau)$=Doppler contribution determined as a function of the measured (vehicle) velocity at the moment $\tau$, $\dot{R}_i(\tau)$=measured range rate between the satellite i and the (satellite receiving) antenna at the moment $\tau$, and $c\Delta t(\tau)$=clock drift (clock error) of the (satellite) receiver at the moment $\tau$.

In this process, the moment $\tau$ can be an almost arbitrary moment after the reference moment $t_0$. By way of these correction values according to equation (3) for the (satellite) range rate, the (satellite) range measurement carried out at the moment t is corrected according to the equation $$PR_{Corr\_i}(t) = PR_i(t) + \Delta R_i(t_0) + \int_{t_0}^{t} \Delta \dot{R}(\tau) d\tau. \tag{4}$$

With the procedure according to equation or formula (4), a high precision is advantageously accomplished for determining position of the vehicle, which precision is valid for a long time duration. The latter is a function of the absolute value of the required precision.

It is advantageous to redetermine the corrections according to equations or formulas (1), (2) or (3), (4) at each reference mark. This further results in the option of arranging the reference marks as a function of the topography of the travel route, since for example, the average velocity is higher for a level travel route than for a travel route in a hilly (mountainous) terrain with many curves.

For the described method, it is merely required that a satellite navigation be possible on the part of the mobile station. This means that it must be possible to receive the transmitting signals of the navigation satellites.

The invention is not limited to the examples described; Rather, it can be applied analogously to further examples. For example, navigation by means of the GLONASS satellites alone is also possible or navigation according to GPS and/or GLONASS satellites.

The invention now being fully described, it will be apparent to one of ordinary skill in the art that any changes and modifications can be made thereto without departing from the spirit or scope of the invention as set forth herein.

What is claimed:

1. A satellite navigation method for a mobile station, wherein the geographic position of the mobile station is determined using a receiving and evaluating unit for the reception and evaluation of satellite navigation signals disposed in the mobile station, said method comprising the steps of:

installing a plurality of reference marks whose geographic positions are known along a possible route of the mobile station;

detecting the reference marks with a reading device installed in the mobile station;

upon detection of a reference mark by the reading device, supplying the known position of the reference mark to the evaluating unit and, from this known position, determining a known reference position for a satellite receiving antenna for the mobile station, and simultaneously determining the associated actual geometric ranges from predetermined, receivable navigation satellites for the reference position;

upon detection of the reference mark, simultaneously determining pseudoranges of the reference position from the predetermined, receivable navigation satellites by satellite navigation using the receiving and evaluating unit;

comparing the pseudoranges with the associated actual ranges for the mobile station at the reference mark, and providing range correction value from the comparison;

at positions between two reference marks, determining further pseudoranges for momentary positions for the mobile station only by satellite navigation, and correcting these further pseudoranges with the correction values; and, determining a momentary position of the mobile station from the corrected further pseudoranges, as needed.

2. A satellite navigation method according to claim 1, wherein:

the reference mark is detected by the reading device of the mobile station at a reference moment $t_0$;

the range correction values are determined at the reference mark according to the equation $$\Delta R_i(t_0) = R_i(t_0) - PR_i(t_0) + c\Delta t(t_0)$$

where $t_0$=reference moment, $\Delta R_i(t_0)$=range correction of the satellite measurement i at the reference moment $t_0$, $R_i(t_0)$=geometric range between a receivable satellite i and the satellite receiving antenna of the mobile station at the reference moment $t_0$, $PR_i(t_0)$=measured range (pseudorange) between the satellite i and the receiving antenna at the reference moment $t_0$, and $c\Delta t(t_0)$=clock error of the satellite receiver in the mobile station at the reference moment $t_0$; and, the pseudoranges determined in the mobile station at a predetermined moment t are corrected according to the equation $$PR_{Corr\_i}(t) = PR_i(t) + \Delta R_i(t_0)$$

where $PR_{Corr\_i}(t)$=corrected pseudorange between the satellite i and the antenna of the mobile station at the moment t, and $PR_i(t)$=measured pseudorange between the satellite i and the antenna at the moment t.

3. A satellite navigation method according to claim 2 further comprising:

additionally determining, within the mobile station, the velocity of the mobile station relative to the earth's surface using a sensor on the mobile station which is independent of the satellite navigation;

determining correction values of the range rate at the reference mark at a moment τ according to the equation $$\Delta \dot{R}_i(\tau) = DP_i(\tau) + DP_F(\tau) - \dot{R}_{i(\tau)} + c\Delta t(\tau)$$

where $\Delta \dot{R}_i(\tau)$=correction of the range rate of the satellite measurement i at the moment τ, $DP_i(\tau)$=Doppler contribution of the i-th satellite as a function of the known satellite movement at the moment τ, $DP_F(\tau)$=Doppler contribution determined as a function of the measured (vehicle) velocity at the moment τ, $\dot{R}_i(\tau)$=measured range rate between the satellite i and the satellite receiving antenna at the reference moment τ, and $c\dot{\Delta}t(\tau)$=clock drift (clock error) of the satellite receiver at the moment τ; and, correcting the pseudoranges determined in the mobile station at a predetermined time t according to the equation $$PR_{Corr\_i}(t) = PR_i(t) + \Delta R_i(t_0) + \int_{t_0}^{t} \Delta \dot{R}(\tau) d\tau.$$

4. A satellite navigation method according to claim 1 further comprising:

additionally determining, within the mobile station, the velocity of the mobile station relative to the earth's surface using a sensor on the mobile station which is independent of the satellite navigation;

determining correction values of the range rate at the reference mark at a moment τ according to the equation $$\Delta \dot{R}_i(\tau) = DP_i(\tau) + DP_F(\tau) - \dot{R}_i(\tau) + c\Delta t(\tau)$$

where $\Delta \dot{R}_i(\tau)$=correction of the range rate of the satellite measurement i at the moment τ, $DP_i(\tau)$=Doppler contribution of the i-th satellite as a function of the known satellite movement at the moment τ, $DP_F(\tau)$=Doppler contribution determined as a function of the measured (vehicle) velocity at the moment τ, $\dot{R}_i(\tau)$=measured range rate between the satellite i and the satellite receiving antenna at the reference moment τ, and $c\dot{\Delta}t(\tau)$=clock drift (clock error) of the satellite receiver at the moment τ; and, correcting the pseudoranges determined in the mobile station at a predetermined time t according to the equation $$PR_{Corr\_i}(t) = PR_i(t) + \Delta R_i(t_0) + \int_{t_0}^{t} \Delta \dot{R}(\tau) d\tau.$$

where $PR_{Corr\_i}(t)$=corrected pseudorange between the satellite i and the antenna of the mobile station at the moment t, and $PR_i(t)$=measured pseudorange between the satellite i and the antenna at the moment t.

5. A satellite navigation method according to claim 4, wherein the traffic route is a railroad track.

6. A satellite navigation method according to claim 1, wherein the mobile station is installed on a traffic route-guided vehicle, and the reference marks are installed along the traffic route.

7. A satellite navigation method according to claim 1, further including configuring the reference marks as well as the reading device such that an additional data exchange or signal exchange is permitted between the vehicle and a reference mark influencing the vehicle.

8. A satellite navigation method according to claim 1, wherein the reference marks are detected by the reading device by use of electromagnetic waves.

9. A satellite navigation method according to claim 1, wherein the step of installing a plurality of reference marks includes arranging the reference marks along a traffic route as a function of the route's topography.

10. A satellite navigation method according to claim 1, further comprising providing the mobile station with a data store in which at least the geographic positions of all reference marks which are required for determining the position of the mobile station along its travel route with a predetermined precision are stored.

11. A satellite navigation method according to claim 1 wherein the step of determining a momentary position of the mobile station includes determining the momentary position by differential satellite navigation using the corrected pseudoranges.

12. A satellite navigation method according to claim 1 wherein the actual geometric ranges and pseudoranges are determined from at least three navigation satellites.

* * * * *